United States Patent [19]

Espenan et al.

[11] Patent Number: 5,393,433
[45] Date of Patent: Feb. 28, 1995

[54] METHOD USING SEPARATION MEMBRANES TO TREAT A FLUID CONTAINING MATTER IN SUSPENSION AND IN SOLUTION

[75] Inventors: Jean-Michel Espenan, Chateau; Franck Saux, Ste Foix D'Aigrefeuille, both of France

[73] Assignee: AQUASOURCE, societe en nom collectif, Rueil Malmaison, France

[21] Appl. No.: 142,727

[22] Filed: Oct. 25, 1993

[30] Foreign Application Priority Data

Mar. 11, 1992 [FR] France ............... 92 13142

[51] Int. Cl.$^6$ .............................. B01D 61/00
[52] U.S. Cl. ................................ 210/650; 210/636; 210/791; 210/333.01; 210/805; 210/660; 210/754
[58] Field of Search .......... 210/636, 195.2, 257.2, 210/108, 333.01, 791, 650, 768, 321.69, 259, 805, 641, 652, 749, 758, 754, 660, 650

[56] References Cited

U.S. PATENT DOCUMENTS

| | | | |
|---|---|---|---|
| 5,028,319 | 7/1991 | Budin et al. | 210/321.69 |
| 5,043,071 | 8/1991 | Anselme et al. | 210/636 |
| 5,047,154 | 9/1991 | Comstock et al. | 210/636 |
| 5,112,489 | 5/1992 | Hartmann | 210/257.2 |
| 5,271,830 | 12/1993 | Faivre et al. | 210/321.69 |

FOREIGN PATENT DOCUMENTS

| | | |
|---|---|---|
| 0433200 | 6/1991 | European Pat. Off. |
| 2628337 | 3/1988 | France |
| 810104531 | 6/1983 | Japan |
| 870149091 | 12/1988 | Japan |
| 90045685 | 11/1991 | Japan |
| 90015617 | 1/1992 | Japan |

*Primary Examiner*—Robert A. Dawson
*Assistant Examiner*—Ana M. Fortuna

[57] ABSTRACT

A method of treating a fluid containing matter in suspension and/or in solution by using separation membranes, in which method a "feed" additive for adsorption and/or filtration purposes is added to the fluid to be treated, and a "backwash" additive for the purpose of improving backwashing is added to the membrane backwash fluid, wherein a backwash additive is chosen that is capable of being neutralized by the feed additive, the backwash fluid which contains the backwash additive and which has washed away unused feed additive is collected as a backwash discharge, the backwash discharge is allowed sufficient contact time to enable neutralization to take place in said discharge, and the resulting product is separated into a residual product that is concentrated in solid matter and a fluid that is recycled to the inlet of the installation.

4 Claims, 3 Drawing Sheets

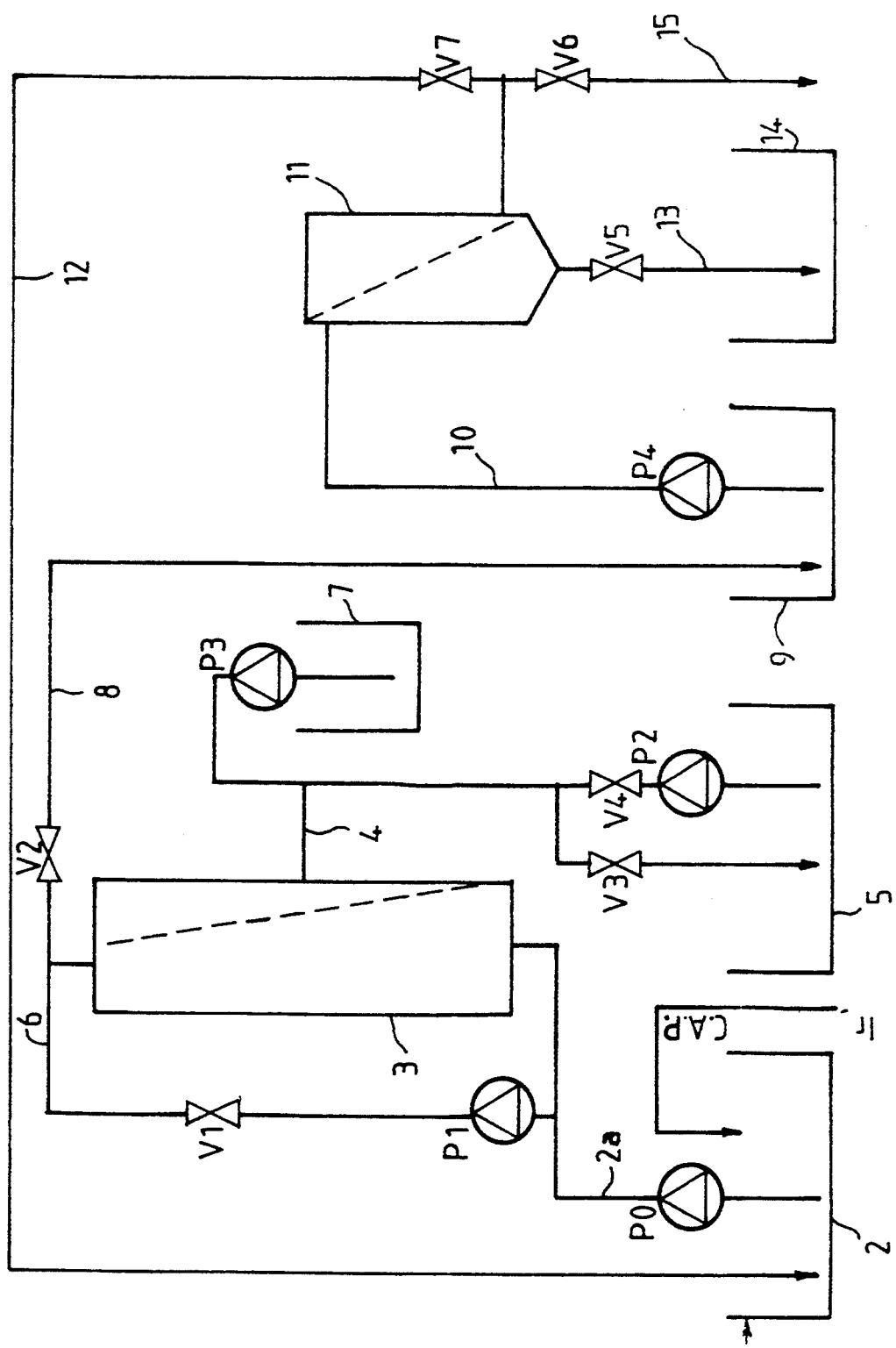
FIG_2

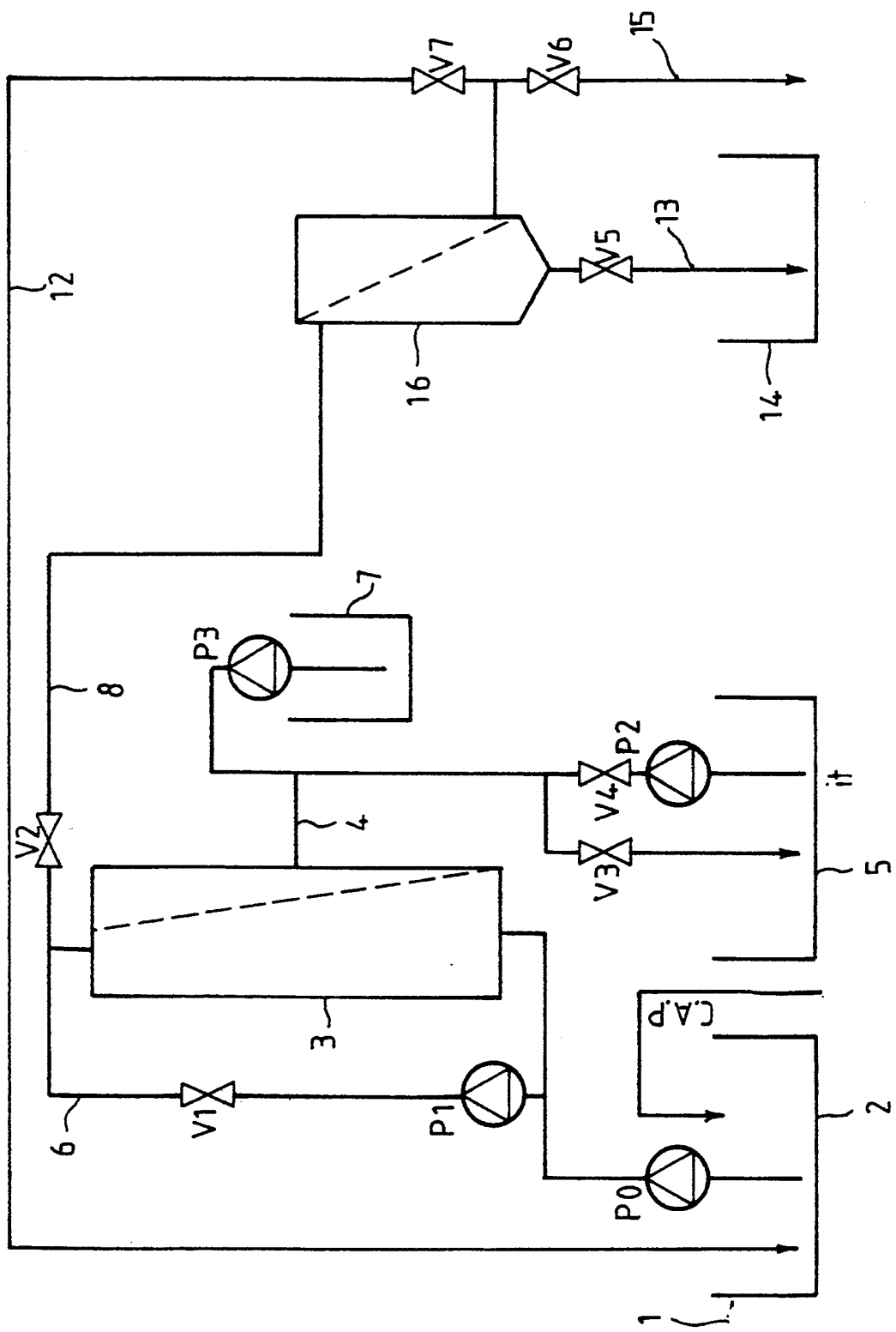
FIG_3

METHOD USING SEPARATION MEMBRANES TO TREAT A FLUID CONTAINING MATTER IN SUSPENSION AND IN SOLUTION

The invention relates to a method of treating a fluid containing matter in suspension and/or in solution. The method makes use of separation membranes, and relates in particular to treating raw water to make it potable.

BACKGROUND OF THE INVENTION

Methods using separation membranes to treat raw water in order to make it potable have been under development for several years. Feed water is injected under pressure into separation modules, generally constituted by bundles of tubular membranes (in particular hollow fibers) for nanofiltration, microfiltration, ultrafiltration, or reverse osmosis. The modules may operate in dead-end mode where all of the water to be treated passes through the membranes and is purified, or else they may operate in cross-flow mode where only a fraction of the water to be treated passes through the membranes, while the remainder that does not pass through the membranes is recycled (filter loop). In both cases, matter in suspension accumulates on the separation side of the membranes and may end up by clogging them. It is therefore essential to provide for the membranes to be periodically backwashed by injecting a backwash fluid in the direction opposite to the treatment direction to dislodge the matter deposited on the membranes and to wash it away. It is often advantageous to use previously treated water as the backwash fluid.

To improve backwashing, it is known that additives can be added to the backwashing fluid that serve to enhance detachment of the deposit while enabling it to retain a degree of cohesion (limited fragmentation) by performing various physico-chemical actions on the deposit that has accumulated on the membranes, which actions are not all fully understood at present. Chlorine type oxidizing agents are known for this purpose.

It is also found to be advantageous to add an additive to the feed water that is suitable for adsorbing matter in solution that would not otherwise be stopped by the membranes. A substance commonly used in the treatment of water is active carbon. When performing separation on membranes, active carbon is used in powder form, and in some cases it provides the advantage of increasing filtration flows appreciably (about 30% to 40%), perhaps because of its abrasive action on the deposit that forms on the membranes.

During backwashing, water containing chlorine and passing through the membranes in the reverse direction to the treatment direction washes away the mixture of active carbon and other matter deposited on the membranes, together with the active carbon in powder form in suspension in the water that is in contact with the deposited matter, and the water obtained during backwashing (backwash discharge) contains, inter alia, the separated solid matter, active carbon that has adsorbed various solutes, chlorine, and chlorinated derivatives formed by the action of the chlorine on the substances that come into contact therewith.

At present, since only small flow rates are treated in this way, the backwash discharge is dumped in the drainage network for rainwater or for sewage, or it is transported to a distant sewage works. Ecological risks and economic losses (backwashing often consumes 10% of the treated water) can thus result from using membranes to perform separation in installations of large production capacity.

It therefore appears necessary to treat the backwash discharge so as to recover as much reusable water as possible together with a residue having a high concentration of solid matter that can be disposed of ecologically and cheaply.

Conventional methods of treating sewage suffer from the drawbacks of being lengthy and complex because of the composition of the matter in suspension in the backwash discharge; and above all they go against the looked-for purpose of using separation membranes, namely treating water while avoiding the production of waste containing chemicals or their reaction products.

OBJECT AND SUMMARY OF THE INVENTION

The invention solves the problem by providing a method of treating a fluid containing matter in suspension and/or in solution by using separation membranes, in which method a "feed" additive for adsorption and/or filtration purposes is added to the fluid to be treated, and a "backwash" additive for the purpose of improving backwashing is added to the membrane backwash fluid, wherein a backwash additive is chosen that is capable of being neutralized by the feed additive, the backwash fluid which contains the backwash additive and which has washed away unused feed additive is collected as a backwash discharge, the backwash discharge is allowed sufficient contact time to enable neutralization to take place in said discharge, and the resulting product is separated into a residual product that is concentrated in solid matter and a fluid that is recycled to the inlet of the installation.

The feed additive may be an additive that adsorbs dissolved matter or an additive that improves filtering of matter in suspension, or it may be an additive that performs both functions simultaneously, as does active carbon, or two or more distinct additives may be used. This additive must necessarily be incapable of passing through the separation membranes so as to avoid contaminating the treated fluid (permeate).

The backwash additive is used essentially to enhance detachment of the deposit both by acting on the chemical bonds which form between the membrane and the deposit, and also by partially fragmenting the deposit. This additive must pass through the membrane since it is injected to the side of the membrane that does not have any deposit. Oxidizing agents, and in particular chlorine, are suitable for this purpose. Since such substances have harmful effects on the environment, they must not be dumped unchanged, and the pair of additives (feed/backwash) is selected so that the backwash additive is capable of being neutralized by the feed additive.

The terms "neutralize" and "neutralization" are used in the present application to designate an action of destroying, eliminating, or inhibiting the backwash additive chemically and/or physically, and in fact any action that enables the water to be recycled.

When the pair of additives is activated carbon in powder form and chlorine, the activated carbon present in the separation module has adsorbed dissolved matter, but it has not spent sufficient time in the filter to become saturated. It is its residual adsorption capacity that makes it possible to neutralize or "trap" the chlorine in the backwash fluid.

The backwash discharge is maintained without separation for a length of time that is sufficient to enable the feed additive to neutralize the backwash additive. This may be done with or without stirring.

Backwashing is performed periodically over periods of time that are short compared with filtering time periods, but at flow rates that are relatively large (and backwashing may consume as much as 10% of the water treated in the preceding filtering cycle).

Surprisingly, it has been observed that the usual interval of time between two backwashes, generally about 30 minutes, suffices for neutralization to take place between the feed additive and the backwash additive. In the particular case of an additive pair comprising active carbon in powder form and chlorine, the chlorine is adsorbed by the carbon in less than 20 minutes. It is thus possible to store successive backwash discharges and allow them to separate in installations of small size. Because the matter separated from the water to be treated is in a relatively coherent form, it is easy to separate the neutralized discharge into a residue having a high concentration of solid matter and water that has been cleared of the backwash additive, of the feed additive, and of enough of the deposited matter to enable it to be recycled via the inlet of the installation for the purpose of returning to the membrane separation module.

This separation into water and residue is preferably performed by means that are purely mechanical without adding any further additives (thickening agents, flocculating agents). For example, such means may be: sedimentation; centrifuging; and preferably filtering. Any appropriate means not requiring the addition of extra ingredients can be used. Naturally, if necessary under some circumstances, certain ingredients that improve separation could be added within the context of the present invention.

Certain known filter devices make it possible to obtain a concentrated residue that is well dehydrated. In the context of the present invention, the residue contains a relatively high content of active carbon in powder form (unsuitable for regeneration, unlike active carbon in granular form) and it therefore has a certain energy value that enables the resulting residue to be burned with an advantageous yield of energy, possibly after additional drying. The separated water is then sufficiently purified to be recycled to the membrane separation module, generally without additional sedimentation or purging. Under such circumstances, the percentage of backwash water that is lost turns out to be no more than 1% to 3% of the treated water, and a residue is obtained that is advantageous from the energy point of view; furthermore, the ecological characteristics of water treatment by separation membranes are maintained.

The invention also provides apparatuses for implementing the method of the present invention, which apparatuses are described in detail below, and comprise, downstream from conventional treatment apparatus using separation membranes, apparatus for treating the backwash discharge of the invention.

Such treatment apparatus may be constituted by two distinct elements: one serving to neutralize the discharge; and the other serving to perform separation proper. Alternatively it may comprise a single apparatus through which a transit time sufficient for separation purposes also allows neutralization to take place.

BRIEF DESCRIPTION OF THE DRAWINGS

Other characteristics and advantages of the present invention appear on reading the following detailed description made with reference to the accompanying drawings, in which:

FIG. 2 is a diagram of apparatus for implementing the method of the invention with neutralization and separation taking place in two distinct apparatuses; and FIG. 3 is a diagram similar to FIG. 2, but with neutralization and separation taking place in a single apparatus.

MORE DETAILED DESCRIPTION

Figure 1:
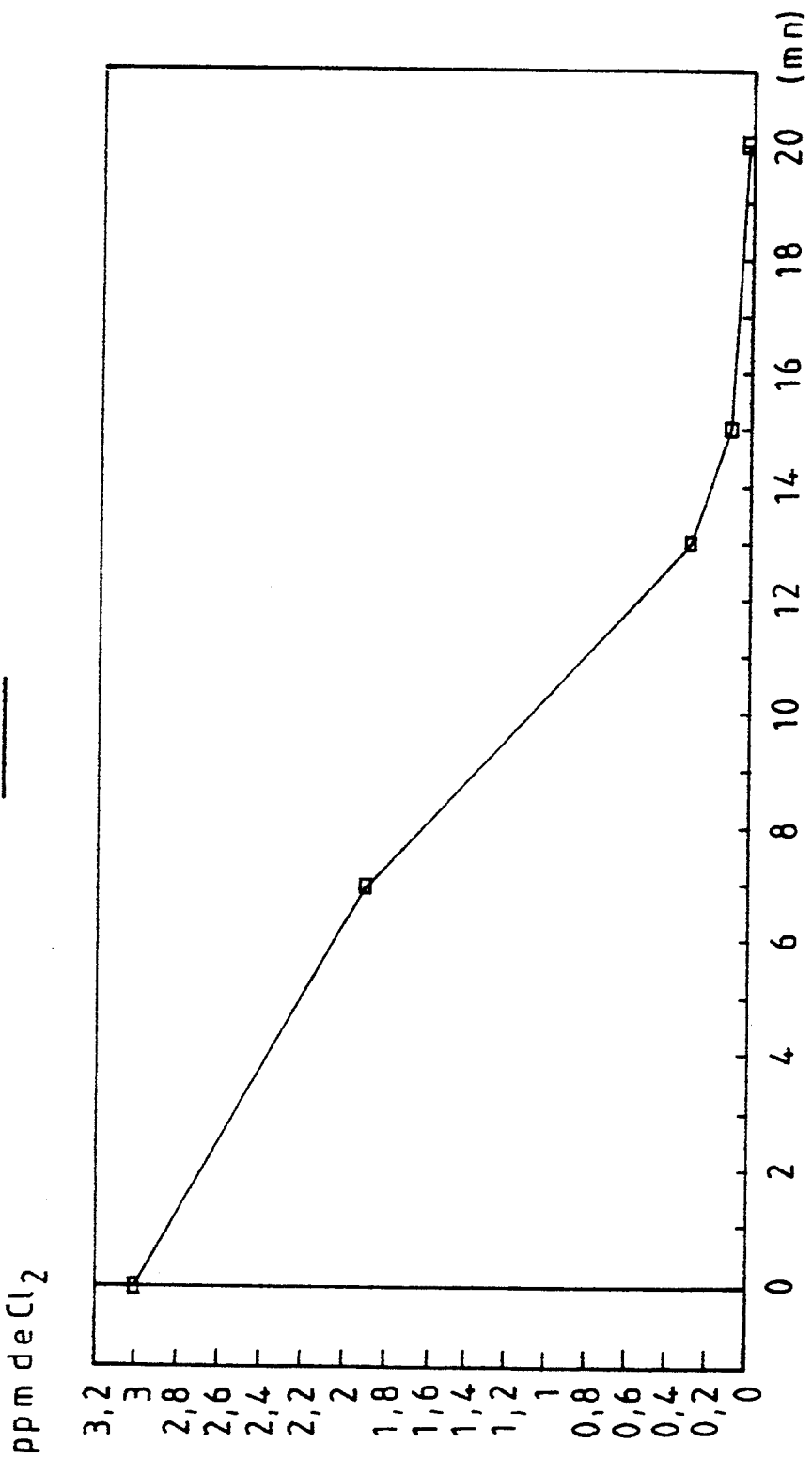
FIG. 1 shows adsorption of chlorine (backwash additive) by the active carbon (feed additive) after backwashing.

To begin with, a conventional installation for treating water by means of separation membranes is described briefly. This installation is common to FIGS. 2 and 3, and the same reference numerals relate to the same elements.

Raw water is delivered by a duct 1 into a feed tank or basin 2 into which active carbon powder (ACP) is also injected. The active carbon may also be injected directly into the separation loop. A pump $P_0$ delivers the water under pressure via a duct 2a to a separation module 3 that is fitted with membranes for microfiltration, ultrafiltration, nanofiltration, or reverse osmosis. The filtered water or "permeate" is delivered by a duct 4 to a tank 5 for collecting permeate, the duct 4 being provided with a valve $V_3$. The water that leaves the separation module without passing through the membranes (via duct 6) is returned to the module 3 by a recirculation pump $P_1$. The duct 6 includes a valve $V_1$ that is normally open while operating in cross-flow mode; closing the valve and stopping the pump $P_1$ makes it possible to operate in dead-end mode.

The backwash apparatus comprises a pump $P_2$ and a valve $V_4$ which, when respectively put into operation and opened, serve to inject water from the permeate tank 5 in the opposite direction to the treatment direction. During backwashing, chlorine is taken from a tank 7 by a pump $P_3$. During backwashing, the valve $V_1$ is closed and the backwash discharge is taken by a duct 8 to further treatment. The duct 8 is provided with a valve $V_2$ that is open during backwashing and that is closed during a separation cycle.

In FIG. 2, the duct 8 delivers the backwash discharge to a tank 9 for collecting the discharge. After pausing for a length of time that is sufficient to enable the backwash additive to be neutralized by the feed additive (in this case to enable the chlorine to be adsorbed by the active carbon), a pump $P_4$ sends the discharge via a duct 10 to a mechanical separator device 11, e.g. a filter or a settling tank. The separated-out water is returned via a duct 12 to the feed tank 2. The residue containing concentrated solid matter is delivered via a duct 13 to a collecting tank 14. A valve $V_5$ enables this residue to be collected continuously or discontinuously depending on the type of the device 11 and on the way in which it is operated. A duct 15 fitted with a valve $V_6$ may be provided for deconcentrating or purging a fraction of the water separated out from the backwash discharge. A valve $V_7$ is then provided in the duct 12 and is closed while $V_6$ is open, and vice versa.

In FIG. 3, the duct 8 takes the backwash discharge directly to a device 16 where neutralization and separation take place simultaneously, with the discharge remaining therein for a length of time that is sufficient for neutralization purposes. The device 16 is then generally of the settling tank type, but other devices could be envisaged.

The transit time through the discharge collection tank 9 (FIG. 2) or through the separation device 16 (FIG. 3) takes account of the time required for the chlorine to be adsorbed by the active carbon. Tests have been performed which show that when 5 parts per million (ppm) of chlorine are injected in the backwash water, then about 3 ppm are to be found in the discharge water reaching the collection tank 9 or the device 16, but that after 20 minutes (min) the chlorine content of the water becomes unmeasurable (less than 0.02 ppm). FIG. 1 is a graph showing such adsorption.

In both cases, the residue collected from the tank 14 may advantageously be burnt, possibly after additional dehydration.

EXAMPLE

With a setup as shown in FIG. 2, the separation device used was an LBM 35 (AQUASOURCE) module for the ultrafiltration membrane, the feed flow was 10 m$^3$/h, and 10 g/m$^3$ of powdered active carbon (PAC) were added thereto. By way of example, the PAC used was of the type W 35 sold under the trademark NORIT (grain size in the range 10 $\mu$m to 150 $\mu$m). Backwashing was performed at a rate of one backwash per hour. 5 ppm of free chlorine in the form of sodium hypochlorite was added to the backwash water. Under such operating conditions, water loss was about 10%.

When using apparatus for treating backwash discharge as shown in FIG. 2, the 10% constituting the backwash discharge was recovered and after pausing for a length time that depends on the volume of the tank, but that was in practice equal to the time between two backwashes, the resultant discharge was applied to the separation device, e.g. a filter. It is possible, for example, to use a FUNDA ® type filter that enables partial drying to take place before sequential unclogging of the filter. All of the powdered active carbon was stopped and it has been observed that there remains no free chlorine nor any chlorinated derivatives produced therefrom in the residual water (adsorption takes place in about 20 minutes, see FIG. 1). The filtrate (water from which the PAC, the chlorine, the resulting chlorinated derivatives, and a major fraction of the solid matter have all been removed) was recycled to the feed tank at the inlet of the installation. Water loss was then found to be about 3%. It is expected that water loss can be further reduced by improving filtering conditions.

When using the variant of FIG. 3, the backwash discharge is applied directly to a device that allows contact to take place and that performs separation, e.g. a settling tank, in which chlorine is adsorbed by the residual capacity of the PAC simultaneously with the discharge being separated into a concentrated solid mater residue and water that can be recycled via the inlet, given that the discharge remains for sufficient time in the device for long enough.

It is also possible to treat the backwash discharge in conventional manner by separation using membranes in one or more stages prior to applying the discharge to the treatment apparatus of the present invention. Such stages that perform treatment by means of membranes are similar to the device for .treating raw water by membranes, which device may itself comprise a plurality of stages, or one or more separation modules in series.

Although the above description relates essentially to treating raw water and to the use of powdered active carbon and chlorine as the pair of additives, it will be understood that the invention may be applied to other fluids and to other pairs of feed additive and backwash additive.

It is claimed:

1. A method of treating a fluid containing matter in suspension and/or in solution by using separation membranes, in which method a feed additive for adsorption and/or filtration purposes is added to the fluid to be treated, and a backwash additive for the purpose of improving backwashing is added to a membrane backwash fluid, comprising the steps of choosing a backwash additive that is capable of being neutralized by the feed additive, collecting in a tank as a discharged backwash solution the backwash fluid which contains the backwash additive and has washed-away unused feed additive, allowing the discharged backwash solution sufficient contact time in said tank to enable neutralization to take place in said discharged backwash solution, and separating the resulting product into a residual product that is concentrated in solid matter and a fluid that is recycled and added to the fluid to be treated.

2. A treatment method according to claim 1, wherein the separation of the discharged backwash fluid into a residual product and a fluid is performed by purely mechanical means, without adding any additives.

3. A method according to claim 1, wherein the feed additive is activated carbon in powder form and the backwash additive is an oxidizing agent.

4. A method according to claim 3, wherein the oxidizing agent is chlorine.

* * * * *